United States Patent
Williamson et al.

(10) Patent No.: US 6,840,274 B1
(45) Date of Patent: Jan. 11, 2005

(54) WELDABLE MOUNT FOR FUEL SYSTEMS COMPONENT

(75) Inventors: Nancy Williamson, Connersville, IN (US); Thomas Blease, Connersville, IN (US); Jeffrey Devall, Gwent (GB); Dwight Smith, Milton, IN (US)

(73) Assignee: Stant Manufacturing Inc., Connersville, IN (US)

( * ) Notice: Subject to any disclaimer, the term of this patent is extended or adjusted under 35 U.S.C. 154(b) by 425 days.

(21) Appl. No.: 10/009,787

(22) PCT Filed: Jun. 1, 2000

(86) PCT No.: PCT/US00/15178

§ 371 (c)(1),
(2), (4) Date: Nov. 12, 2001

(87) PCT Pub. No.: WO00/73039

PCT Pub. Date: Dec. 7, 2000

Related U.S. Application Data

(60) Provisional application No. 60/136,990, filed on Jun. 1, 1999.

(51) Int. Cl.[7] .................................. F16K 24/04
(52) U.S. Cl. .................. 137/588; 137/590; 137/592; 251/144; 264/248; 264/250; 264/274; 264/275
(58) Field of Search ................. 137/588, 590, 137/592, 43, 202; 251/144; 264/248, 250, 274, 275; 123/520, 516

(56) References Cited

U.S. PATENT DOCUMENTS

| | | | | |
|---|---|---|---|---|
| 4,323,529 | A | * 4/1982 | Roberts et al. | ............... 264/69 |
| 4,730,652 | A | 3/1988 | Bartholomew | |
| 5,139,043 | A | 8/1992 | Hyde et al. | |
| 5,404,907 | A | 4/1995 | Benjey et al. | |
| 5,954,091 | A | 9/1999 | Leadford | |
| 5,975,116 | A | * 11/1999 | Rosas et al. | ........... 137/315.11 |
| 6,003,499 | A | * 12/1999 | Devall et al. | ............... 123/520 |
| 6,035,883 | A | 3/2000 | Benjey | |
| 6,085,771 | A | 7/2000 | Benjey | |
| 6,189,567 | B1 | * 2/2001 | Foltz | ......................... 137/587 |
| 6,488,877 | B1 | * 12/2002 | Amburgey et al. | ......... 264/219 |

* cited by examiner

Primary Examiner—Michael P. Colaianni
Assistant Examiner—Monica A. Fontaine
(74) Attorney, Agent, or Firm—Barnes & Thornburg LLP

(57) ABSTRACT

A vent apparatus (10) includes a tank mount (12) made of a weldable plastics material and a fuel system component such as a valve assembly (13). Valve a assembly (13) includes a valve housing (14) made of a nonweldable plastics material and a valve (21) movable in a valve chamber (24) formed in valve housing (14) to open and close an aperture (23) leading to a venting outlet (22). Tank mount (12) supports valve housing (14) in a position in a mounting aperture (16) formed in a fuel tank (18). Valve housing (14) is made by injecting on-weldable plastics material into a mold containing the pre-molded tank mount (12).

21 Claims, 7 Drawing Sheets

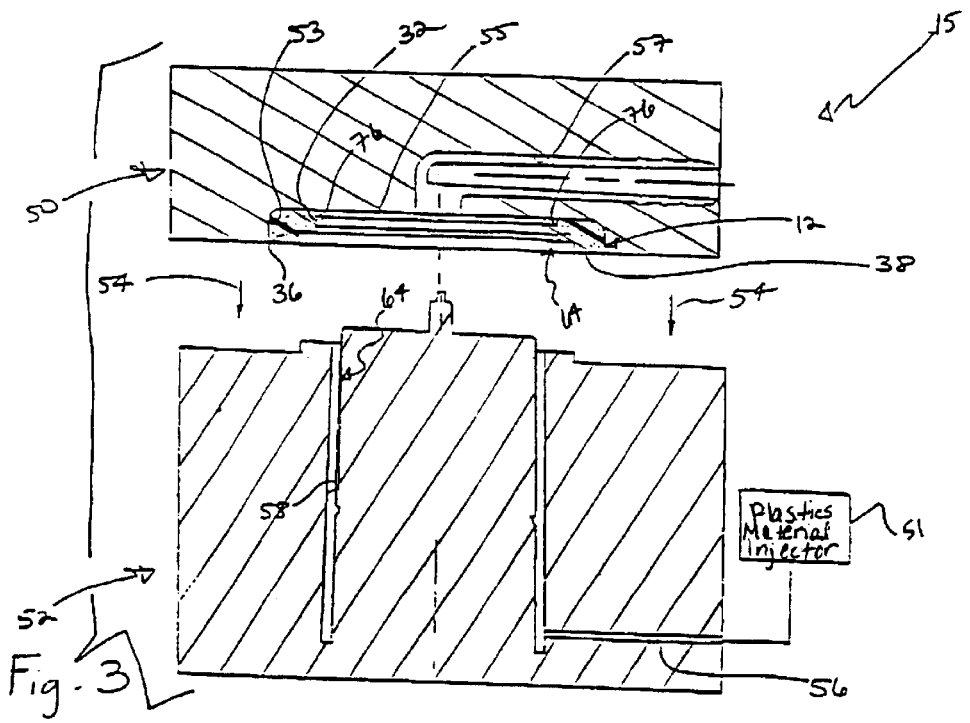
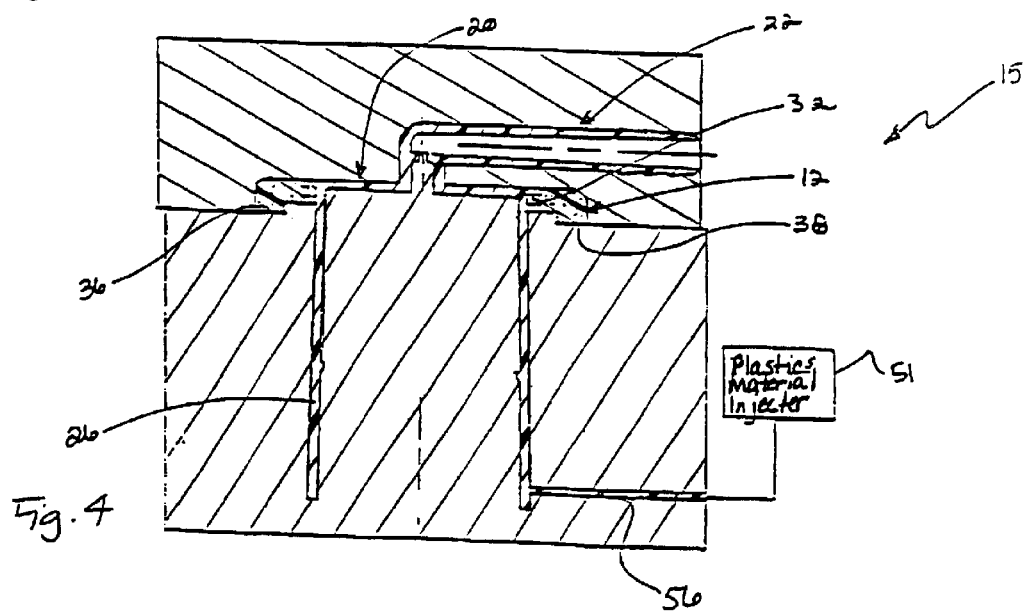

ns Component

This application claims the benefit of Provisional application 60/136,990 filed Jun. 1, 1999.

BACKGROUND AND SUMMARY OF THE INVENTION

The present invention relates a fuel tank valve assembly and particularly, to a fuel tank valve assembly that is suitable for use with a fuel tank constructed of a polymeric material. More particularly, the present invention relates to a valve assembly having a mount adapted to be welded to the fuel tank to mount the valve assembly in a fixed position in an aperture formed in the fuel tank.

Mounting assemblies are used to mount a venting valve assembly in a top wall of a fuel tank. See, for example, U.S. Pat. No. 4,966,189 to Harris and PCT International Publication No. WO 99/27284 to Foltz, each of which is incorporated herein by reference. Further, U.S. Pat. No. 5,404,907 to Benjey et al. and U.S. Pat. No. 5,130,043 to Hyde both relate to weldable vapor vent valve systems and are also incorporated by reference herein.

According to the present invention, a method of forming a vent apparatus adapted to be coupled to a fuel tank is provided. The method includes the steps of providing a tank mount made of a weldable plastics material and adapted to be welded to an exterior surface of a fuel tank and injecting a non-weldable plastics material into a valve housing mold cavity containing the tank mount to overmold the tank mount with the nonweldable plastics material to produce a valve housing having a venting outlet arranged to communicate with a valve chamber formed in the valve housing and arranged to extend above the tank mount.

In preferred embodiments, the tank mount is ring-shaped and has either an L-shaped, T-shaped, or J-shaped cross section. During the injecting step, nonweldable plastics material surrounds a portion of the ring-shaped tank mount to mechanically couple the non-weldable valve housing to the weldable tank mount so that a portion of the tank mount can be welded to the exterior surface of a fuel tank to support the valve housing in an aperture formed in the fuel tank.

A spring-loaded valve is positioned to move up and down in a valve chamber formed in the valve housing to open and close an aperture formed in a top wall of the valve housing and arranged to provide an opening into the valve housing venting outlet above the tank mount. The tank mount is positioned to cause a top wall of the tank mount to lie in coplanar relation with the top wall of the valve housing.

Additional features of the present invention will become apparent to those skilled in the art upon consideration of the following description of preferred embodiments of the invention exemplifying the best mode of carrying out the invention as presently perceived.

BRIEF DESCRIPTION OF THE DRAWINGS

The detailed description particularly refers to the accompanying figures in which:

FIG. 3 is a sectional view of a plastic injection mold having an upper mold portion and a lower mold portion, here shown spaced-apart in an opened position, and also showing the ring-shaped tank mount propositioned within the upper mold portion prior to injection of a non-weldable plastics material into a mold cavity formed in the upper and lower mold portions (in the manner shown in FIG. 4), FIG. 4 is a sectional view similar to FIG. 3 showing the upper and lower mold portions in a closed position and a non-weldable plastics material used to make the valve housing having been injected into a channel formed within the lower mold portion in order to fill both the upper and lower mold portions for the purpose of "over-molding" non-weldable plastics material onto the ring-shaped tank mount to form a valve housing coupled to the ring-shaped tank mount;

DETAILED DESCRIPTION OF THE DRAWINGS

Figure 1:
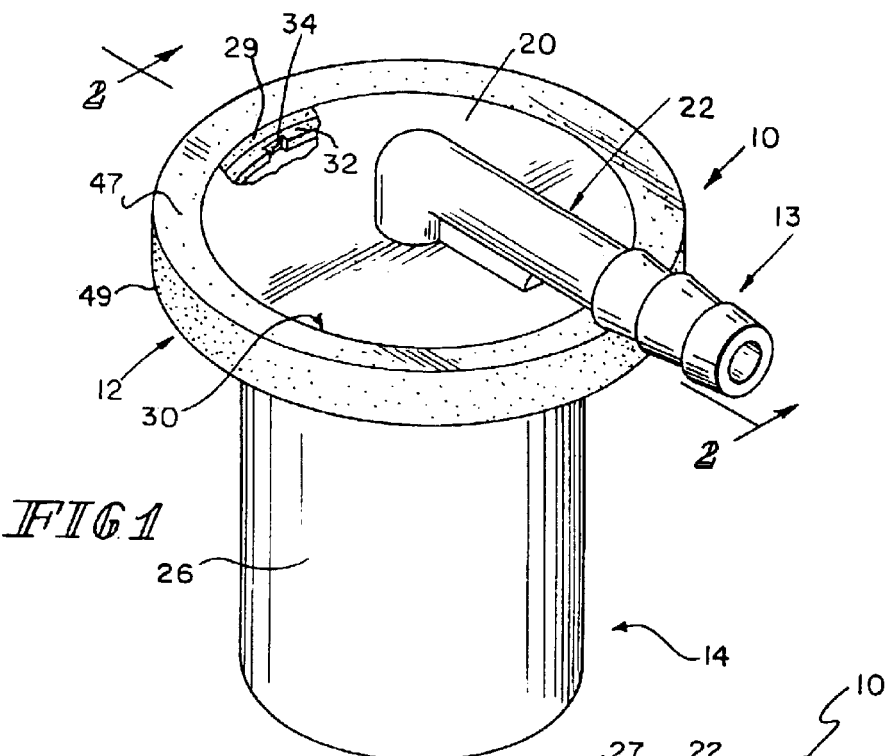
FIG. 1 is a perspective view of a weldable ring-shaped tank mount formed to include a circular opening and a valve housing made of a non-weldable material and formed to include a circular top wall positioned to lie in the circular opening formed in the ring-shaped tank mount, a tank venting outlet coupled to and positioned to lie above the top wall, and a cylindrical sleeve coupled to and positioned to lie below the top wall and formed to include a valve chamber therein sized to receive a valve as shown in FIG. 2.

A vent apparatus 10 is shown in FIG. 1 and is configured to be mounted on an exterior surface 40 of a fuel tank 18. Vent apparatus 10 is formed to include a weldable tank mount 12 and a fuel systems component coupled to weldable tank mount 12. Tank mount 12 is made from a weldable plastics material and fuel systems component is made from a non-weldable plastics material. In the illustrated embodiment, the fuel systems component is a valve assembly 13 for controlling the discharge of fuel and fuel vapor from fuel tank 18. It is within the scope of this disclosure to use tank mount 12 to support other fuel system components (not shown) such as a fuel sender unit or other type of valve in fuel tank 18 or another type of tank.

Valve assembly 13 is formed to include a valve housing 14 and a spring-loaded valve 21. As mentioned above, tank mount 12 of the present invention is made from a weldable plastics material such as high density polyethylene (HDPE) or any other suitable polymeric plastic or material. Valve housing 14 is molded from a non-weldable plastics material such as acetal, for example. Tank mount 12 is provided for supporting valve housing 14 in a mounting aperture 16 of fuel tank 18, as shown in FIG. 2.

Figure 2:
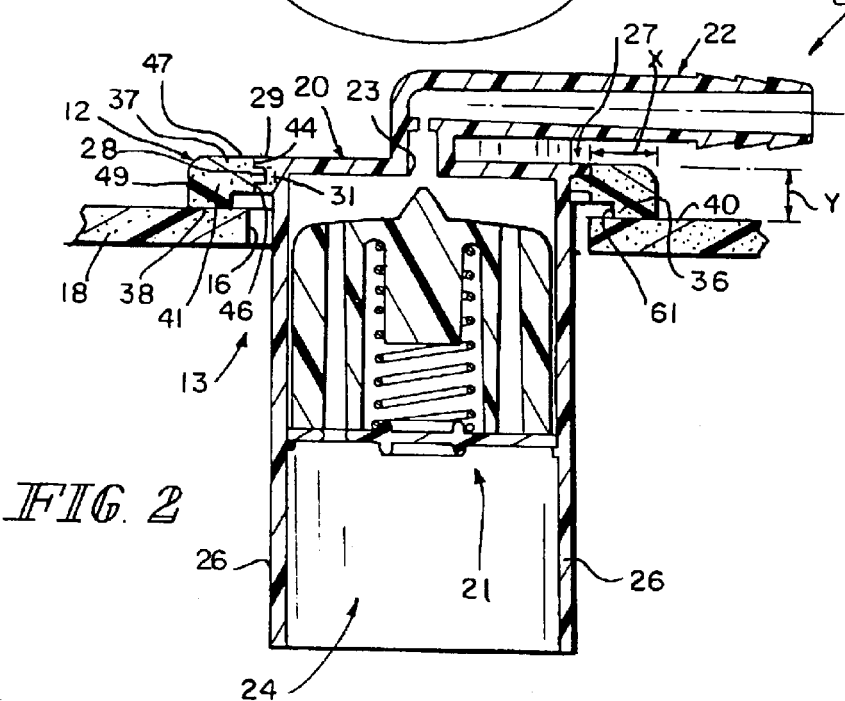
FIG. 2 is a sectional view taken along line 2—2 of FIG. 1 showing the ring-shaped tank mount welded to a fuel tank made of a weldable plastics material so that the valve housing is positioned to lie within a mounting aperture formed in a top wall of the fuel tank and also showing the "L-shaped" cross section of the ring-shaped tank mount and a spring-loaded valve positioned to lie and move within the valve chamber in order to open and close the tank venting outlet.

Vent apparatus 10 is provided for mounting within fuel tank 18, as shown in FIG. 2, in order to equalize the pressure between fuel tank 18 and the atmospheric pressure. Similar to tank mount 12, fuel tank 18 is made from a weldable plastics material so that tank mount 12, also made from a weldable plastics material, and fuel tank 18 may be welded together in order to couple apparatus 10 securely with fuel tank 18. Apparatus 10 is made using an "over-mold" process in accordance with the disclosure herein wherein tank mount 12 is pre-molded and inserted into a valve housing mold or plastic injection mold 15, as shown in FIGS. 3 and 4. The nonweldable plastics material, forming valve housing 14, is then injected around tank mount 12 into a valve housing mold cavity 64 formed in plastic injection mold 15 around tank mount 12. Because of the design of tank mount 12, tank mount 12 becomes mechanically coupled to valve housing 14 once the non-weldable liquid plastics material injected into mold 15 cools and sets. The process by which apparatus 10 is made will be described below in more detail. As stated above, vent apparatus 10 is formed to include tank mount 12 and a fuel systems component herein disclosed as valve assembly 13 which includes valve housing 14 and valve 21. Valve housing 14 is molded from a non-weldable plastics material. Valve housing 14 is formed to include a circular top wall 20, a venting outlet 22 coupled to and positioned to lie above top wall 20, and a cylindrical sleeve 26 which is coupled to and positioned to lie below top wall 20, as shown in FIGS. 1 and 2. Cylindrical sleeve 26 is hollow and thus defines an interior region providing a valve chamber 24, as shown in FIG. 2.

Valve 21 is positioned to lie within valve chamber 24 and operates to open and close an aperture 23 which is defined by top wall 20 and leads to venting outlet 22 for purposes of equalizing the pressure within fuel tank 18 with that of the atmospheric pressure. Fuel and fuiel vapor is conducted from fuel tank 18 to valve chamber 24, through aperture 23, and out venting outlet 22 to another destination, for example, a fuel vapor treatment canister including a carbon filter. Top wall 20 is also formed to include an annular flange 27 which defines a channel 28, as shown in FIG. 2, for receiving a portion of tank mount 12 therein.

As mentioned before, tank mount 12 is formed from a weldable plastics material such as HDPE or any other suitable polymeric plastic. Tank mount 12 is formed to include an interior wall 29 defining a passageway 30 for receiving top wall 20 of valve housing 14. Interior wall 29 includes an upper portion 44 and a lower portion 46. Tank mount 12 also includes an inner rib 32 coupled to interior wall 29, positioned to lie midway between upper portion 44 and lower portion 46, and positioned to extend into passageway 30. Inner rib 32 is formed to be received within channel 28 of flange 27 of top wall 20. Inner rib 32 includes at least one notch 34 while flange 27 includes at least one corresponding locator tab 31 received within notch 34 in order to prevent rotation between tank mount 12 and valve housing 14.

Tank mount 12 further includes a body 36 having an "L-shaped" cross section, as shown, for example, in FIG. 2, adapted to be coupled to fuel tank 18. Body 36 includes an annular arm or top wall 37 having a top surface 47 coupled to interior wall 29 and positioned to extend radially outwardly from interior wall 29 as shown in FIGS. 1 and 2. Body 36 further includes an annular foot or outer rim 41 having an outer surface 49, coupled to top wall 37 and positioned to extend radially downwardly from top wall 37. Top wall 37 is therefore arranged to extend radially inwardly from outer rim 41. Outer rim 41 further includes a downwardly facing bottom surface 38 for engagement with exterior surface 40 of fuel tank 18. Top surface 47 of top wall 37 has a horizontal length X and outer surface 49 of outer rim 41 has a vertical height Y such that X is greater than Y as shown in FIG. 2. Valve assembly 13 is positioned to lie within mounting aperture 16 of fuel tank 18 in order to provide a mounting arrangement for weldably coupling tank mount 12 of apparatus 10 directly to fuel tank 18.

Figure 13:
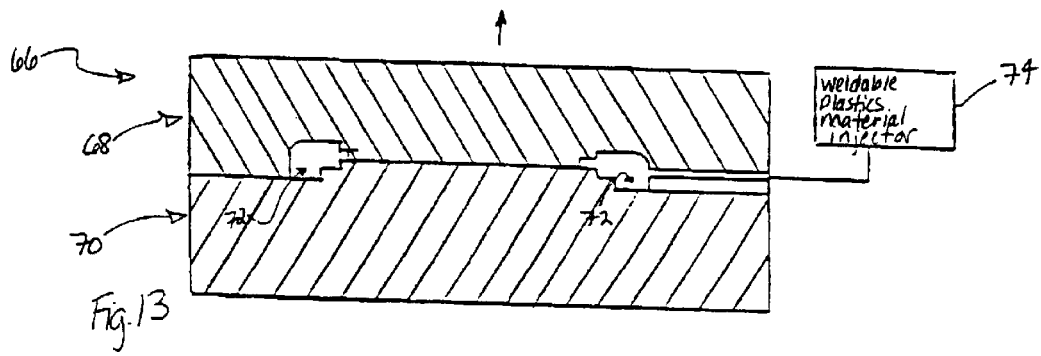
FIG. 13 is a sectional view showing a tank mount mold including an annular tank mount mold cavity having an L-shaped cross section in order to form the tank mount shown in FIGS. 1 and 2.

Tank mount 12 is molded using a tank mount mold 66, as shown in FIG. 13. Tank mount mold 66 includes upper and lower mold portions 68, 70 forming an annular tank mount mold cavity 72 having an "L-shaped" cross section. A weldable plastics material is injected into annular tank mount mold cavity 72 by a weldable plastics material injector 74 in order to form ring-shaped tank mount 12 also having an L-shaped cross section.

Valve housing 14 is molded using plastic injection mold 15, as shown in FIG. 3. Plastic injection mold 15 includes an upper mold portion 50 and a lower mold portion 52. Upper and lower mold portions 50, 52 are movable between an opened position, as shown in FIG. 3, and a closed position, as shown in FIG. 4. Lower mold portion 52 is coupled to a plastics material injector 51 provided for injecting the liquid non-weldable plastics material such as acetal into lower mold portion 52 of plastic injection mold 15.

Upper mold portion 50 is formed to define a mount-receiving cavity 53, a top wall-forming cavity 55, and an outlet-forming cavity 57, as shown in FIG. 3. Lower mold portion 52 is formed to define a sleeve-forming cavity 58. Top wall-forming cavity 55 further includes an inner rib encapsulation portion 76 formed to surround inner rib 32 of tank mount 12 when tank mount 12 is positioned to lie in mold 15. As shown in FIG. 3, tank mount 12 is pre-molded and inserted within mount-receiving cavity 53 of upper mold portion 50 when upper and lower mold portions 50, 52 are in the opened position. Upper and lower mold portions 50, 52 are then moved to the closed position, as shown by arrows 54, to retain tank mount 12 within mold 15, as shown in FIG. 4.

Once upper mold portion 50 and lower mold portion 52 are moved to the closed position, plastic material injector 51 injects the liquid non-weldable plastics material, such as acetal, through a channel 56 formed in lower mold portion 52. The liquid injected plastics material fills sleeve-forming cavity 58 of lower mold portion 52 first and then proceeds to fill top wall-forming cavity 55 and nozzle-forming cavity 57 of upper mold portion 50. The result is that weldable tank mount 12 is over-molded onto the non-weldable liquid plastics material used to form valve housing 14.

Once the cavities formed in upper and lower mold portions 50, 52 have been filled, the non-weldable liquid plastics material in those cavities is allowed to cool. After the liquid plastics material has cooled to a solid form, a mechanical bond is established between tank mount 12 and valve housing 14 due to the structure of tank mount 12 and valve housing 14, as described previously. Once cooled, upper and lower mold portions 50, 52 are moved to the opened position and valve housing 14 and tank mount 12, which are now mechanically coupled to one another, are removed from mold 15. Venting outlet 22 is positioned to lie above tank mount 12 and cylindrical sleeve 26 is positioned to lie below tank mount 12.

Because of the use of the over-molding process disclosed herein, a larger percentage of apparatus 10 is able to be made of the non-permeable weldable material which forms tank mount 12. Therefore, the surface area of the weldable plastics material exposed to fuel from fuel tank 18 is reduced. This reduction in surface area may act to reduce the emissions given off in vehicle use. A smaller amount of weldable plastics material is needed to make mount 12 in order to couple valve assembly 13 to fuel tank 18. Further, the non-weldable plastics material used to form valve housing 14 may have a tendency to shrink after having been molded. Once valve housing 14 is injection-molded over tank mount 12, the non-weldable material of valve housing 14 will shrink around tank mount 12 in order to form a tight mechanical bond between tank mount 12 and valve housing 14.

Using the method disclosed herein, vent apparatus 10 is formed by first forming tank mount mold 66 to include annular tank mount mold cavity 72 having an L-shaped cross section. The next step is to inject a weldable plastics material into annular tank mount mold cavity 72 in order to provide ring-shaped tank mount 12. Tank mount 12 also has an L-shaped cross section including annular foot or outer rim 41 having downwardly facing bottom surface 38 adapted to be welded to exterior surface 40 of fuel tank 18, as shown in FIG. 2. The final step includes injecting the non-weldable plastics material into valve housing mold cavity 64, which contains tank mount 12, in order to over-mold tank mount 12 with the non-weldable plastics material which forms valve housing 14. Valve housing 14 is thus formed to encapsulate inner rib 32 in order to form a mechanical bond between tank mount 12 and valve housing 14.

Another embodiment is provided in FIGS. 5–8 showing an alternate apparatus 110 including an alternate T-shaped tank mount 112 and an alternate valve assembly 113. Valve assembly 113 is formed to include an alternate valve housing 114 and valve 21. Tank mount 112 is ring-shaped and configured to form a passageway 130. Tank mount 112 is also formed from a weldable plastics material such as HDPE or any other suitable polymeric plastic.

Figure 14:
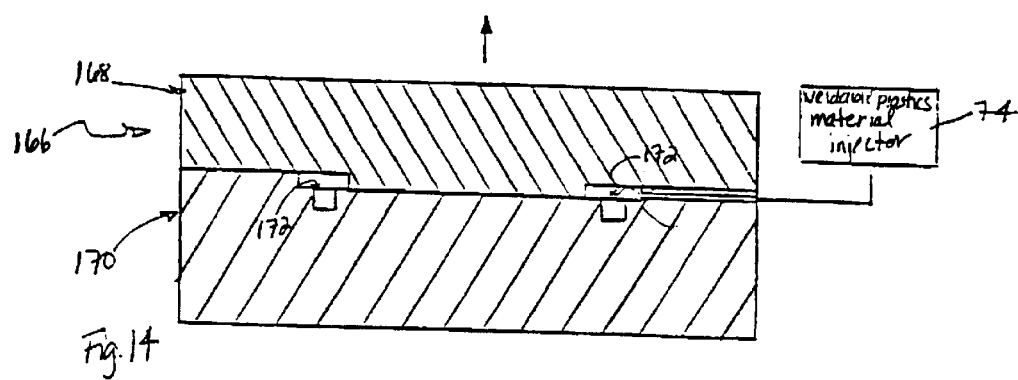
FIG. 14 is a sectional view similar to FIG. 13 showing an alternate tank mount mold including an annular tank mount mold cavity having a T-shaped cross section in order to form the alternate tank mount shown in FIGS. 5 and 6.

Alternate tank mount 112, similar to tank mount 12, is molded using an alternate tank mount mold 166, as shown in FIG. 14. Alternate tank mount mold 166 includes upper and lower mold portions 168, 170 forming an alternate annular tank mount mold cavity 172 having a T-shaped cross section. The weldable plastics material is injected into annular tank mount mold cavity 172 by a weldable plastics material injector 74 in order to form alternate tank mount 112 also having a T-shaped cross section.

Figure 5:
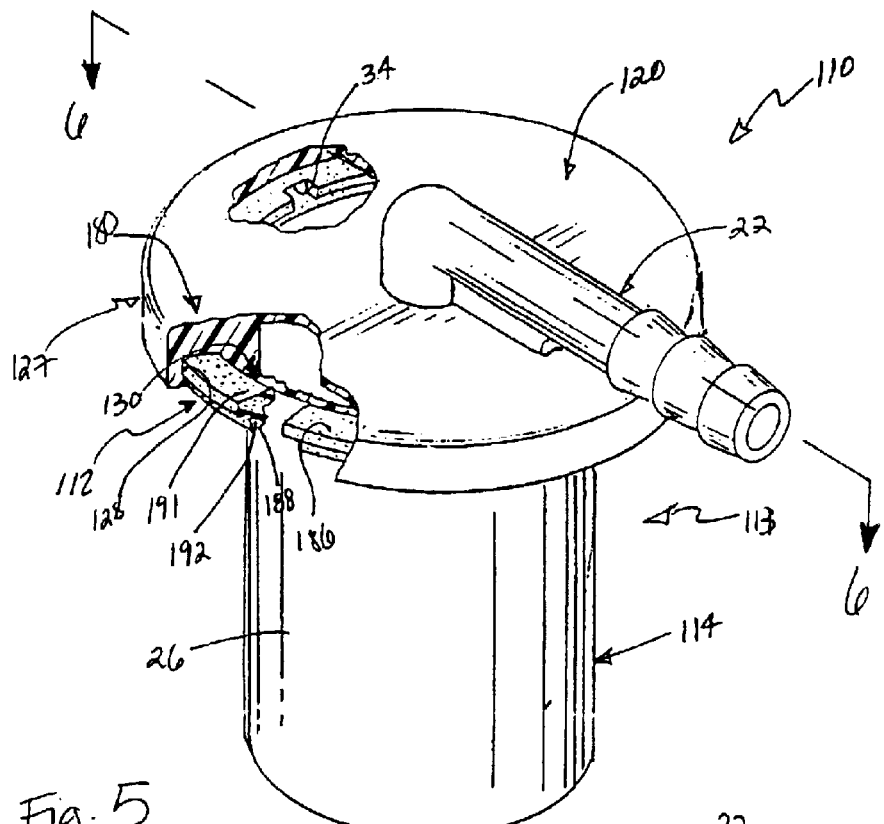
FIG. 5 is a perspective view similar to FIG. 1 showing another embodiment of a ring-shaped tank mount made of a weldable material and a valve housing supported by the ring-shaped tank mount and made of a non-weldable plastics material, and also showing a "T-shaped" cross section of the weldable ring-shaped mount and the manner in which the weldable ring-shaped tank mount is coupled to an annular flange of circular top wall of the valve housing.
Figure 6:
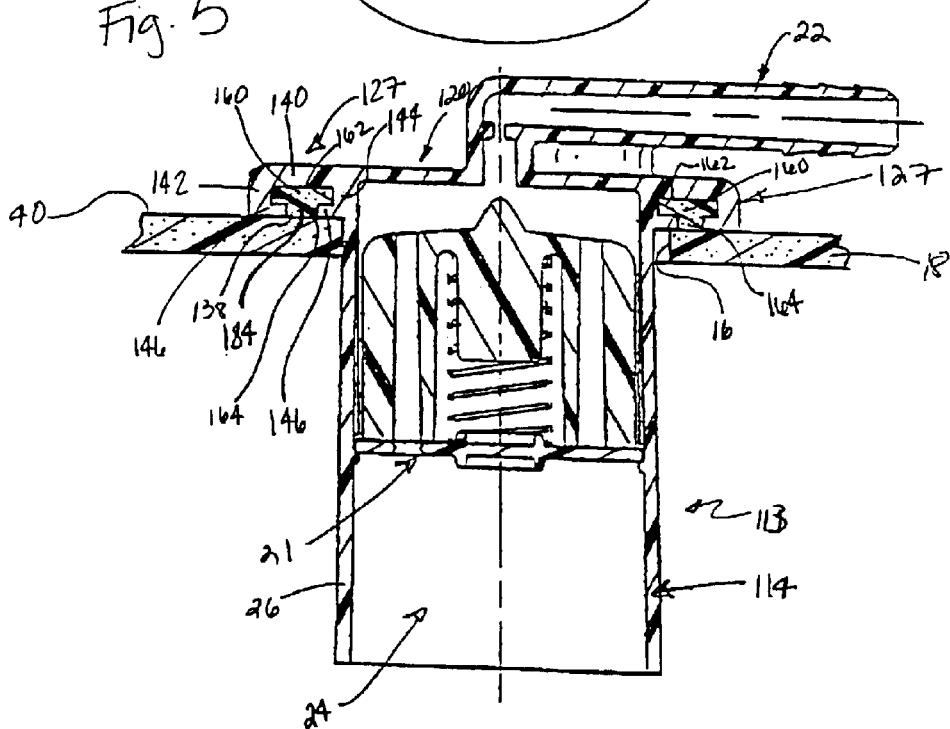
FIG. 6 is a sectional view taken along line 6—6 of FIG. 5 showing the T-shaped annular tank mount welded to the fuel tank and also showing a valve positioned to lie and move within a valve chamber formed in the valve housing in order to open and close a tank venting outlet formed in the valve housing.

Valve housing 114 is molded from a non-weldable plastics material such as acetal, for example. Valve housing 114 similarly includes a circular top wall 120, venting outlet 22 coupled to and positioned to lie above top wall 120, and cylindrical sleeve 26 defining interior region 24. Cylindrical sleeve 26 is coupled to and positioned to lie below top wall 120, as shown in FIGS. 5 and 6. Valve 21 is positioned to lie within valve chamber 24 of valve assembly in order to open and close aperture 23 of top wall 120 leading to venting outlet 22 for purposes of equalizing the pressure within fuel tank 18 with that of the pressure outside fuel tank 18.

Top wall 120 is formed to include an annular flange 127 having an interior opening forming a T-shaped channel 184, as shown in FIGS. 5 and 6. Annular flange 127 includes a top wall 140, opposite side walls 142, 144 coupled to top wall 140, and tab portions 146 coupled to side walls 142, 144 which collectively define channel 128. Channel 128 is formed for receiving tank mount 112 therein. As shown in FIGS. 5 and 6, tank mount 112 is also T-shaped and is formed to include a horizontal member 160 having a top surface 162 positioned to engage top wall 140 of annular flange 127 of top wall 120 and a foot or vertical member 164 coupled to horizontal member 160 and formed to include a downwardly facing bottom surface 138 positioned to engage and weldably couple with fuel tank 18, as shown in FIG. 6.

Valve assembly 113 is positioned to lie within aperture 42 of fuel tank 18 in order to provide a mounting arrangement for weldably connecting tank mount 112 of apparatus 110 directly to fuel tank 18 at bottom surface 138 of tank mount 12. As stated above, fuel tank 18 and mount 112 are each made from a weldable plastics material such as HDPE or any other suitable polymeric plastic. Similar to tank mount 12, alternate tank mount 112 includes notch 34, as shown in FIG. 5. Flange 127 includes a locator tab (not shown) formed to be received within notch 34 of tank mount 112 in order to prevent rotation between tank mount 112 and valve housing 114.

Figure 7:
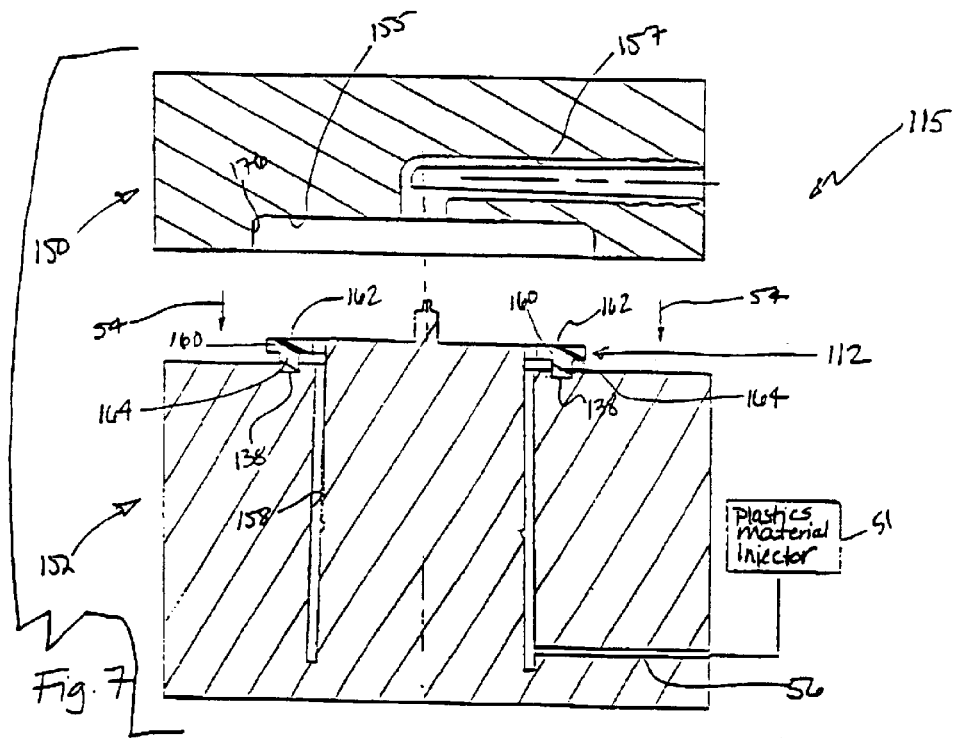
FIG. 7 is a sectional view of an alternate plastic injection mold showing the plastic injection mold having an upper mold portion and a lower mold portion, spaced-apart from one another and in an opened position, and also showing the T-shaped annular tank mount pre-positioned on the lower mold portion.

Valve housing 114 is molded using a plastic injection mold 115. Plastic injection mold 115 is similar in structure and function to plastic injection mold 15, described above, and is shown in FIGS. 7 and 8. Plastic injection mold 1115 includes an upper mold portion 150 and a lower mold portion 152. Lower mold portion 152 is coupled to the plastic material injector 51 and is formed to define a sleeve-forming cavity 158. Upper mold portion 150 is formed to include a top wall-forming cavity 155 and an outlet-forming cavity 157. Tank mount 112 is pre-molded using HDPE or any other suitable weldable plastics material, as described above, and is inserted within plastic injection mold 115, as shown in FIG. 7, when upper and lower mold portions 150, 152 are in the opened position. Tank mount 112 is shown to be inserted within lower mold 152, however, it is within the scope of this disclosure to insert mount 112 within upper mold 150 prior to injecting the non-weldable plastics material onto mold 115.

Figure 8:
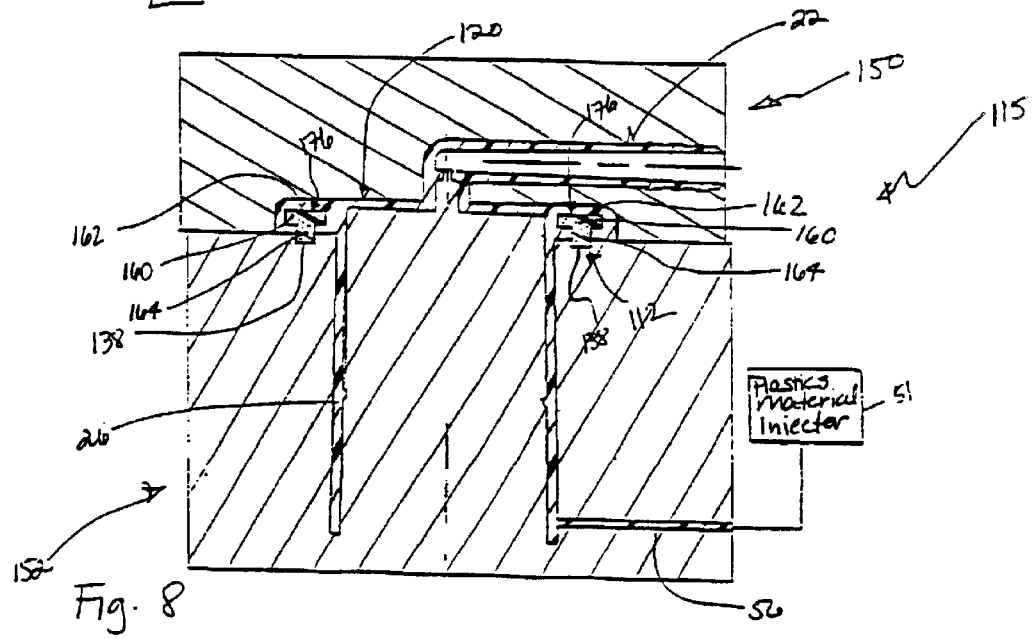
FIG. 8 is a sectional view similar to FIG. 7 showing the upper and lower mold portions in a closed position to allow the non-weldable plastic to be injected through a channel into the lower mold portion in order to fill a mold cavity established in the upper and the lower mold portions in order to "over-mold" the T-shaped weldable tank mount with the non-weldable plastic, which forms the valve housing.

Once tank mount 112 is inserted into mold 115, upper and lower mold portions 150, 152 are moved to the closed position, as shown in FIG. 8, in order to retain tank mount 112 therein. When in the closed position, mold 115 forms an annular tank mount encapsulation portion 176 which completely surrounds alternate tank mount 112 except for downwardly facing bottom surface 138. Plastics material injector 51 then injects the liquid non-weldable plastics material, such as acetal, through channel 56 in order to fill sleeve-forming cavity 158, top wall-forming cavity 155, and outlet-forming cavity 157. Tank mount 112 is thereby over-molded with the non-weldable plastics material. Once the liquid non-weldable plastics material has cooled to a solid form, a mechanical bond is formed between tank mount 112 and valve housing 114 due to the fact that the non-weldable plastics material has encapsulated alternate tank mount 112 while leaving bottom surface 138 of vertical member 164 exposed so that alternate tank mount 112 is able to be welded to fuiel tank 18. Upper and lower mold portions 150, 152 are then moved to the opened position so that alternate T-shaped tank mount 112 and valve housing 114 can be removed from mold 115.

Figure 9:
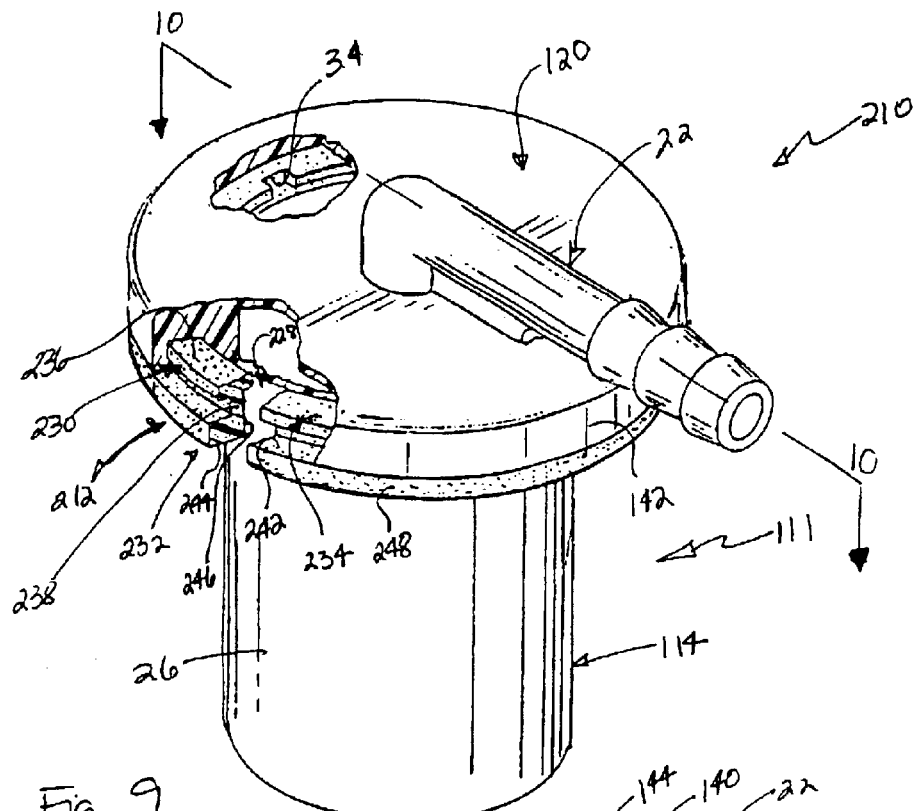
FIG. 9 is a perspective view similar to FIGS. 1 and 5 showing another embodiment of a valve assembly including a ring-shaped tank mount made of a weldable plastics material and a valve housing supported by the ring-shaped tank mount and made of a non-weldable plastics material.
Figure 10:
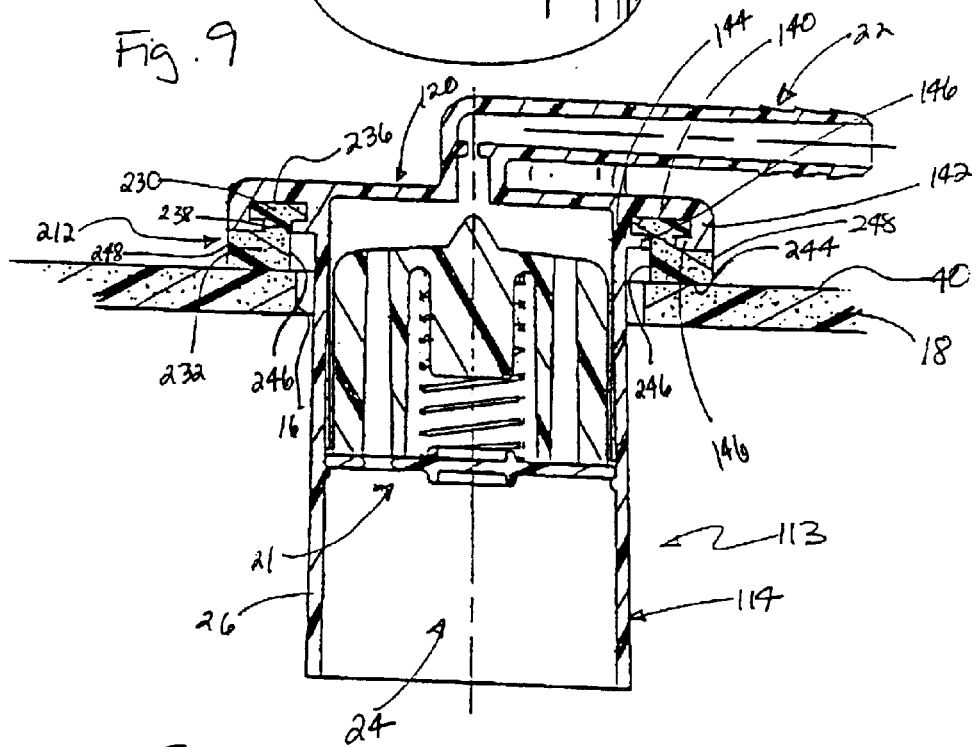
FIG. 10 is a sectional view taken along line 10—10 of FIG. 9 showing a somewhat "J-shaped" cross section of the ring-shaped tank mount that is welded to the fuel tank and a valve that is positioned to lie and move in a valve chamber formed in the valve housing in order to open and close a tank venting outlet formed in the valve housing.

Another embodiment is provided and shown in FIGS. 9 and 10. Alternate apparatus 210 includes alternate valve assembly 113, described above, and alternate tank mount 212. As shown in FIGS. 9 and 10, tank mount 212 is also ring-shaped and configured to form a passageway 228. Tank mount 212 has a somewhat J-shaped cross section as shown, for example, in FIGS. 9 and 10.

Tank mount 212 includes an annular upper T-shaped portion 230 coupled to a foot portion or an annular lower base portion 232. Similar to tank mount 112, upper T-shaped portion 230 of tank mount 212 includes a first horizontal member 234 having a top surface 236 positioned to engage top wall 140 of annular flange 127 of top wall 120 and a vertical member 238 coupled to horizontal member 234 and lower base portion 232. Upper T-shaped portion 230 is formed to be received within T-shaped channel 184 of top wall 120. Therefore, upper T-shaped portion 230 of tank mount 212 is mechanically coupled to flange 180 of top wall 120. T-shaped portion 230 may also be formed to include one or more notches 34, as described above and shown in FIG. 9. Annular flange 180 may then be formed to include a locator tab (not shown) to be received within notch 34 in order to prevent rotation between tank mount 212 and valve housing 114.

Lower base portion 232 of tank mount 12 is generally shaped in the form of a rectangle having a top surface 242, a downwardly facing bottom surface 244, an interior surface 246, and an exterior surface 248, as shown in FIG. 10. Top surface 242 is positioned to engage one of the tab portions 146 of flange 127 and exterior surface 248 is generally in alignment with side wall 142 of flange 127. Bottom surface 244 of lower base portion 232 is adapted to be weldably coupled to fuel tank 18, as shown in FIG. 10. Valve assembly 113 of apparatus 210 is positioned to lie in aperture 42 of fuel tank 18 in order to provide a mounting arrangement for weldably connecting tank mount 212 directly to fuel tank 18 at bottom surface 244 of tank mount 212. Similar to the previously described embodiments, fuel tank 18 and mount 212 are each made from a weldable plastics material such as HDPE or any other suitable polymeric plastic. Because tank mount 212 includes lower base portion 232, a user will be able to see and confirm the weld connection between bottom surface 244 of lower base portion 232 and fuel tank 18 easily.

Figure 15:
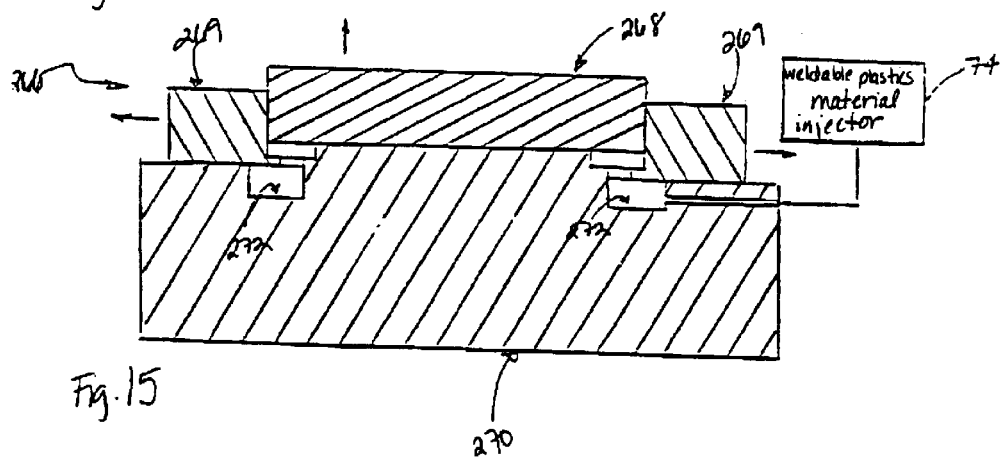
FIG. 15 is a section view similar to FIGS. 12 and 13 showing another alternate tank mount mold including an annular tank mount mold cavity having a shaped cross section in order to form the alternate tank mount shown in FIGS. 9 and 10.

Tank mount 212, similar to tank mounts 12 and 112, is molded using an alternate tank mount mold 266, as shown in FIG. 15. Alternate tank mount mold 266 includes upper and lower mold portions 268, 270 and opposite side mold portions 269 forming an alternate annular tank mount mold cavity 272 having a J-shaped cross section. Although mold 266 is shown to include upper, lower, and side mold portions 268, 270, 269, respectively, it is within the scope of this disclosure to provide any mold 266 which forms annular tank mount mold cavity 272. The weldable plastics material is injected into annular tank mount mold cavity 272 by a weldable plastics material injector 74 in order to form alternate tank mount 212 also having a J-shaped cross section.

Figure 11:
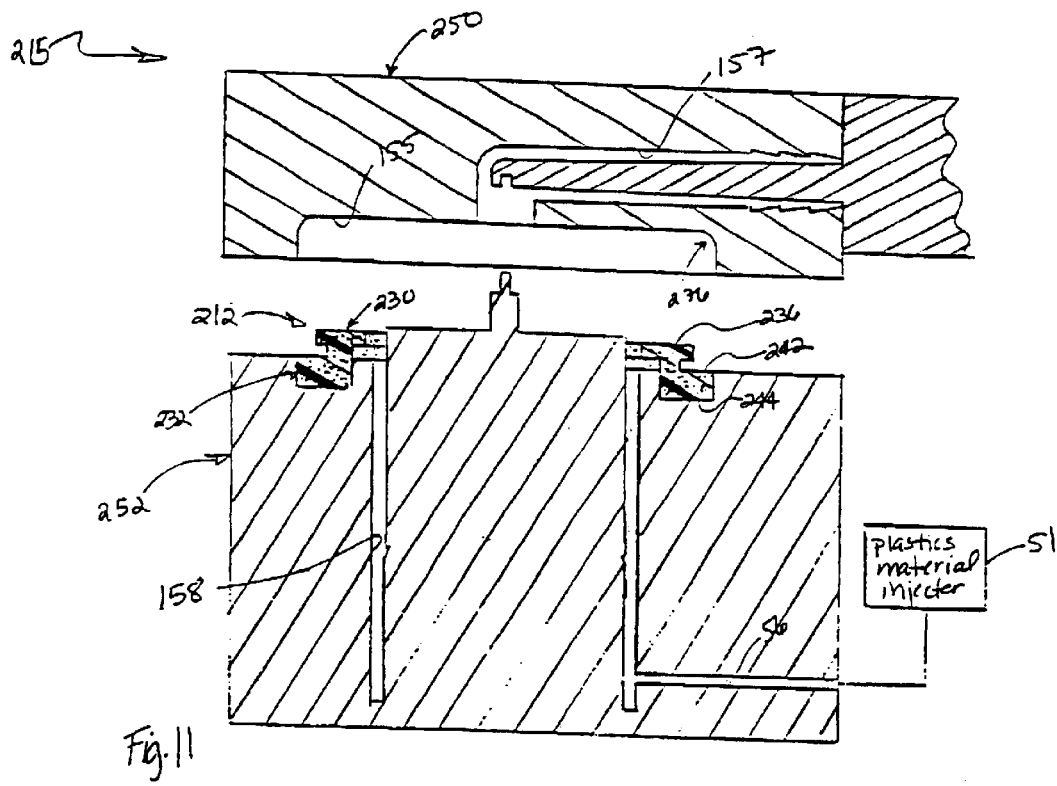
FIG. 11 is a is a sectional view of an alternate plastic injection mold showing the plastic injection mold having an upper mold portion and a lower mold portion, spaced-apart from one another and in an opened position, and also showing the 3-shaped annular tank mount pre-positioned on the lower mold portion.
Figure 12:
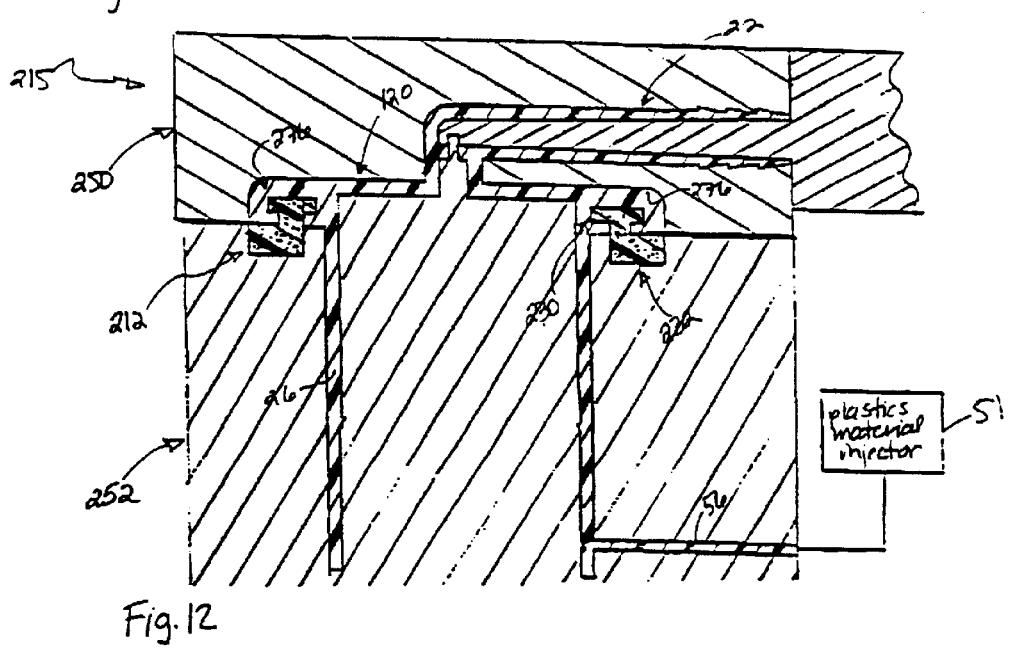
FIG. 12 is a sectional view similar to FIG. 11 showing the upper and lower mold portions in a closed position to allow the non-weldable plastic to be injected through a channel into the lower mold portion in order to fill a mold cavity established in the upper and the lower mold portions in order to over-mold the J-shaped weldable tank mount with the non-weldable plastic, which forms the valve housing.

Vent apparatus 210 is produced using the same injection molding process as described above with reference to vent apparatus 10 and alternate vent apparatus 110. Valve housing 114 of valve assembly 113 is molded using a plastic injection mold 215. Plastic injection mold 215 is similar in structure and function to plastic injection mold 115, described above, and is shown in FIGS. 11 and 12. Plastic injection mold 215 includes an upper mold portion 250 and a lower mold portion 252. Lower mold portion 252 is coupled to plastic material injector 51 and is formed to define sleeve-forming cavity 158. Upper mold portion 250 is formed to include top wall-forming cavity 155 and outlet-forming cavity 157. Tank mount 212 is premolded using HDPE or any other suitable weldable plastics material, as described above, and is inserted within plastic injection mold 215, as shown in FIG. 11, when upper and lower mold portions 250, 252 are in the opened position. Tank mount 212 is shown to be inserted within lower mold 252, however, it is within the scope of this disclosure to insert mount 212 within upper mold 250 prior to injecting the nonweldable plastics material onto mold 215.

Once tank mount 212 is inserted into mold 215, upper and lower mold portions 250, 252 are moved to the closed position, as shown in FIG. 8, in order to retain tank mount 212 therein. When in the closed position, mold 215 forms an annular tank mount encapsulation portion 276 which is formed to entirely surround upper portion 230 of tank mount 212. Plastics material injector 51 then injects the liquid non-weldable plastics material, such as acetal, through channel 56 in order to fill sleeve-forming cavity 158, top wall-forming cavity 155, and outlet-forming cavity 157. Tank mount 212 is thereby over-molded with the non-weldable plastics material in order to mechanically couple valve housing 114 to tank mount 212.

Once the liquid non-weldable plastics material has cooled to a solid form, a mechanical bond is formed between tank mount 212 and valve assembly 113 due to the fact that the non-weldable plastics material has encapsulated upper portion 230 of tank mount 212. Lower base portion 232 of tank mount 212 is thereby provided to be welded to fuel tank 18. Upper and lower mold portions 250, 252 are then moved to the opened position so that J-shaped tank mount 212 and valve housing 114 can be removed from mold 215.

The present invention allows for the attachment of a non-weldable plastics material, such as acetal, to a weldable plastics material, such as HDPE in order for the finished product to be functional for hot plate welding. Each tank mount 12, 112, and 212, for example, is provided for hot plate welding to fuel tank 18 in order to couple apparatus 10, 110, 210 to fuel tank 18.

The over-molding process disclosed herein reduces the amount of weldable plastics material required and thereby reduces the molding difficulties which may arise with the use of weldable plastics material. A reduction in the amount of weldable plastics material required would also result in a cost reduction of that material used. Further, the reduction in weldable plastics material used would facilitate the molding process by dimensionally controlling the non-weldable plastics material portions such as valve housings 14, 114. The use of the over-molding process allows a larger percentage of vent apparatus 10, 110, 210 to be able to be made of the non-permeable weldable material which forms tank mount 12, 112, 212, respectively. Further, the non-weldable plastics material used to form valve housing 14 may have a tendency to shrink during the cooling process after having been injected into the mold. Therefore, the non-weldable material of valve housing 14 will shrink around tank mount 12 in order to form a tight mechanical bond between tank mount 12 and valve housing 14 once valve housing 14 is injection-molded over tank mount 12.

Although the invention has been described in detail with reference to preferred embodiments, variations and modifications exist within the scope and spirit of the invention as described and defined in the following claims.

What is claimed is:

1. A vent apparatus adapted to be coupled to a vehicle fuel tank, the apparatus comprising
   a valve housing made from a non-weldable plastics material and formed to include a cylindrical sleeve defining an interior region, a top wall coupled to the cylindrical sleeve and formed to include on aperture and an annular flange defining an annular channel, and a venting outlet coupled to the top wall at the aperture and provided to conduct fuel and fuel vapor from the interior region of the cylindrical sleeve to another destination outside the valve housing,
   a valve positioned to lie within the interior region of the cylindrical sleeve and formed to move within the interior region of the cylindrical sleeve to open and close the aperture defined by the top wall of the valve housing which leads to the venting outlet, and
   a tank mount made from a weldable plastics material, coupled to the top wall of the valve housing, and formed to include an outer rim adapted to be coupled to the fuel tank to support the cylindrical sleeve within the tank, an annular rib formed to be received within the annular channel of the flange of the top wall, and a top wall coupled to and positioned to lie between the outer rim and the annular rib, the tank mount being positioned to cause the top wall of the tank mount and the top wall of the valve housing to lie in coplanar relation with one another.

2. The apparatus of claim 1, wherein the tank mount is ring-shaped and is further formed to include an annular interior wall defining an opening formed to receive the top wall of the valve housing, and the annular inner rib of the tank mount is coupled to the annular interior wall and is formed to extend into the opening.

3. The apparatus of claim 2, wherein the interior wall of the tank mount includes an upper face and a lower face and the annular inner rib is positioned to lie midway between the upper face and the lower face.

4. The apparatus of claim 2, wherein the top wall of the tank mount is positioned to extend radially outwardly from the interior wall and the outer rim of the tank mount is coupled to the top wall of the tank mount, formed to extend radially downwardly from the top wall of the tank mount, and formed to include a bottom face adapted to be coupled to the fuel tank.

5. The apparatus of claim 2, wherein the inner rib is formed to define a notch and the flange of the valve housing is formed to include a locator tab to be received within the notch in order to prevent rotation between the tank mount and the valve housing.

6. The apparatus of claim 1, wherein the venting outlet of the valve housing is positioned to lie above the tank mount and the cylindrical sleeve of the valve housing is positioned to lie below the tank mount.

7. The apparatus of claim 1, wherein the top wall of the tank mount further includes a top surface and a bottom surface and the outer rim of the tank mount includes an outer surface and an inner surface, and wherein the top surface of the top wall has a length, X, and the outer surface of the outer rim has a height, Y, and further wherein X is greater than Y.

8. A vent apparatus adapted to be coupled to a fuel tank, the apparatus comprising
   a valve housing formed to include a cylindrical sleeve defining an interior region, a top wall coupled to the cylindrical sleeve and formed to include an aperture and an annular flange defining an annular channel, and a venting outlet coupled to the top wall at the aperture in order to conduct fuel and fuel vapor from the interior region of the cylindrical sleeve to another destination outside the valve housing,
   a valve positioned to lie within the interior region of the cylindrical sleeve and formed to move within the interior region of the cylindrical sleeve to open and close the aperture defined by the top wall of the valve housing, and
   a tank mount coupled to the top wall of the valve housing and formed to include an outer rim adapted to be coupled to the fuel tank to support the cylindrical sleeve within a mounting aperture of the tank and an annular rib formed to be received within the annular channel of the flange and wherein the valve housing is includes a locator tab coupled to the annular flange and the annular rib includes a notch formed to receive the locator tab of the valve housing in order to prevent rotation between the valve housing and the tank mount.

9. The apparatus of claim 8, wherein the tank mount includes a top wall and the venting outlet of the valve housing is positioned to lie above the top wall of the tank mount and the cylindrical sleeve of the valve housing is positioned to lie below the top wall of the tank mount.

10. The apparatus of claim 9, wherein the tank mount further includes an interior wall defining an opening for receiving the top wall of the valve housing therein and the inner rib of the tank mount is coupled to the interior wall and positioned to extend into the opening of the tank mount, and wherein the tank mount further includes a top wall positioned to extend radially outwardly from the interior wall, and the outer rim is coupled to the top wall and is positioned to extend radially downwardly from the top wall.

11. The apparatus of claim 9, wherein the valve housing is made from a non-weldable plastics material and the tank mount is made from a weldable plastics material and the inner rib of the tank mouth is received within the channel of the flange of the top wall of the valve housing to cause the tank mount to be mechanically coupled to the valve housing.

12. A vent apparatus adapted to be coupled to a fuel tank, the apparatus comprising a valve housing made from a non-weldable plastics material and formed to include a cylindrical sleeve defining an interior region, a top wall coupled to the cylindrical sleeve and formed to include an aperture and an annular flange having an interior opening forming a channel adapted to face the fuel tank, and a venting outlet coupled to the top wall at the aperture and provided to conduct fuel and fuel vapor from the interior region of the cylindrical sleeve to another destination outside the valve housing, a valve positioned to lie within the interior region of the cylindrical sleeve and formed to move within the interior region of the cylindrical sleeve to open and close the aperture defined by the top wall of the valve housing which leads to the venting outlet, and a tank mount made from a weldable plastics material and formed to be received within the channel of the flange of the top wall of the valve housing to cause the flange to completely surround the tank mount, the tank mount having a bottom surface adapted to be weldably coupled to the fuel tank in order to support the valve housing within a mounting aperture formed in the fuel tank.

13. The apparatus of claim 12, wherein the tank mount forms a T-shaped cross section and the channel of the flange of the valve housing is similarly formed to define a T-shaped cross-section.

14. The apparatus of claim 13, wherein the tank mount includes a horizontal portion and a vertical portion coupled to the horizontal portion at a first end and adapted to be weldably coupled to the fuel tank at a second end defining the bottom surface.

15. The apparatus of claim 13, wherein the tank mount is further formed to define a notch and the flange of the valve housing includes a locator tab formed to be received within the notch of the tank mount in order to prevent rotation between the tank mount and the valve housing.

16. The apparatus of claim 12, wherein the annular flange of the valve housing is formed to include a top wall coupled to the top wall of the valve housing, opposite side walls positioned to lie in spaced-apart relation to each other, and a tab portion coupled to each side wall in order to define the T-shaped channel.

17. A vent apparatus adapted to be coupled to a fuel tank, the apparatus comprising a valve housing made from a non-weldable plastics material and formed to include a cylindrical sleeve defining an interior region, a top wall coupled to the cylindrical sleeve and formed to include an aperture and an annular flange having an interior opening forming a channel adapted to face the fuel tank, and a venting outlet coupled to the top wall at the aperture and provided to conduct fuel and fuel vapor from the interior region of the cylindrical sleeve to another destination outside the valve housing, a valve positioned to lie within the interior region of the cylindrical sleeve and formed to move within the interior region of the cylindrical sleeve to open and close the aperture defined by the top wall of the valve housing which leads to the venting outlet, and a tank mount made from a weldable plastics material formed to include a T-shaped portion formed to be received within the channel of the flange of the top wall of the valve housing to cause the flange to completely surround the T-shaped portion and a base portion coupled to the T-shaped portion and adapted to be weldably coupled to the fuel tank in order to support the valve housing within a mounting aperture of the fuel tank.

18. The apparatus of claim 17, wherein the flange of the valve housing is formed to include a locator tab and the T-shaped portion of the tank mount is formed to define a notch formed to receive the locator tab therein to prevent rotation of the tank mount relative to the valve housing.

19. The apparatus of claim 17, wherein the T-shaped portion is formed to include a horizontal portion and a vertical portion coupled to the horizontal portion at a first end and coupled to the base portion at a second end, and the base portion is formed to include a top surface coupled to the vertical portion, an interior surface, and exterior surface, and a bottom surface adapted to be coupled to the fuel tank.

20. The apparatus of claim 19, wherein the flange is formed to include an outer side wall and the outer side wall is positioned to lie in coplanar relation with the exterior surface of the base portion of the tank mount.

21. The apparatus of claim 19, wherein the annular flange of the valve housing is formed to include a top wall coupled to the top wall of the valve housing, opposite side walls positioned to lie in spaced-apart relation to each other, and a tab portion coupled to each side wall in order to define the T-shaped channel.

* * * * *